(12) United States Patent
Miller

(10) Patent No.: US 10,674,858 B2
(45) Date of Patent: Jun. 9, 2020

(54) POUR OVER BEVERAGE SYSTEM

(71) Applicant: FELLOW INDUSTRIES INC., San Francisco, CA (US)

(72) Inventor: Jake Miller, San Francisco, CA (US)

(73) Assignee: FELLOW INDUSTRIES INC., San Francisco, CA (US)

( * ) Notice: Subject to any disclaimer, the term of this patent is extended or adjusted under 35 U.S.C. 154(b) by 369 days.

(21) Appl. No.: 15/731,464

(22) Filed: Jun. 13, 2017

(65) Prior Publication Data

US 2017/0360251 A1 Dec. 21, 2017

Related U.S. Application Data

(60) Provisional application No. 62/392,918, filed on Jun. 15, 2016.

(51) Int. Cl.
*A47J 31/02* (2006.01)
*A47J 31/10* (2006.01)
*A47J 31/06* (2006.01)

(52) U.S. Cl.
CPC ........... *A47J 31/10* (2013.01); *A47J 31/0631* (2013.01); *A47J 31/0636* (2013.01); *A47J 31/02* (2013.01)

(58) Field of Classification Search
CPC .... A47J 31/02; A47J 31/0621; A47J 31/0615; A47J 31/0631; A47J 31/0636; A47J 31/10
USPC .................. 99/304, 306, 317, 322
See application file for complete search history.

(56) References Cited

U.S. PATENT DOCUMENTS

| RE17,399 | E | * | 8/1929 | Page | A47J 31/02 99/285 |
| 2,138,198 | A | * | 11/1938 | Weber | A47J 31/0621 99/299 |
| 2,227,540 | A | * | 1/1941 | Fry | A47J 31/02 99/292 |
| 2,381,151 | A | * | 8/1945 | Wolcott | A47J 31/02 99/316 |
| 3,744,397 | A | * | 7/1973 | Herrera | A47J 31/10 99/293 |
| 4,520,716 | A | * | 6/1985 | Hayes | A47J 31/02 99/295 |
| 6,276,262 | B1 | * | 8/2001 | Chen | A23F 3/18 426/435 |
| 2010/0263548 | A1 | * | 10/2010 | Kokatsu | A47J 31/02 99/306 |
| 2014/0083303 | A1 | * | 3/2014 | Giessler | A47J 31/0615 99/306 |

* cited by examiner

*Primary Examiner* — Reginald Alexander
(74) *Attorney, Agent, or Firm* — James A. Gavney, Jr.; JAG Patent Service

(57) ABSTRACT

A pour-over beverage system is disclosed. The pour-over beverage system includes a double walled vacuum sealed cup feature or pour-over reservoir for holding a steeped beverage and a flow control mechanism or flow control insert attached to a bottom portion of the double walled vacuum sealed cup feature or pour-over reservoir for dispensed the steeped beverage. The system also preferably includes a double walled vacuum sealed capturing vessel or capturing reservoir for capturing the steeped beverage dispensed through the control mechanism or flow control insert.

13 Claims, 3 Drawing Sheets

POUR OVER BEVERAGE SYSTEM

RELATED APPLICATION

This application claims priority under 35 U.S.C. § 119(e) from the U.S. provisional patent application Ser. No. 62/392,918, filed on Jun. 15, 2016, and titled "POUR OVER COFFEE DRIPPER". The U.S. provisional patent application Ser. No. 62/392,918, filed on Jun. 15, 2016, and titled "POUR OVER COFFEE DRIPPER" is hereby incorporated by reference.

TECHNICAL FIELD

This invention generally relates to a method and apparatus for brewing hot beverages from an infusible material for consumption. More particularly this invention related to a system for and method of making pour-over beverages, such as coffee and/or tea, wherein the infusible material is treated to a pour-over of hot liquid to make pour-over beverages.

BACKGROUND ART

Many different methods for brewing coffee or steeping tea have emerged over time. Coffee is brewed by percolation, by infusion with water under pressure and by other methods. In one such method, coffee grounds or tea leaves, as an infusible material are brought into contact with a large body of heated water for a predetermined time to effect the brewing or steeping of a beverage. After the infusible material is removed, the beverage is ready to be poured from a pot.

Over time certain criteria have been recognized as critical to brewing hot beverages, such as coffee and tea, successfully. Some of these criteria are outside the control of the manufacturers that offer for sell a beverage brewing apparatus. For example, tea drinkers control the quality and quantity of the water and tea leaves used to brew the beverage. Consumers control limited criteria with respect to coffee in terms of a coffee brand selection, the fineness of the resulting coffee grounds and the ratio of water and coffee grounds during brewing.

Additionally, the beverage brewing apparatus may control other important criteria for successfully brewing a hot beverage. For example, the apparatus may control steeping or brewing, temperature and time. In recent years, the so-called "French Press" method of brewing coffee has become a popular standard and has also been adapted for steeping tea. An apparatus for implementing this method includes a plunger with a disk made of a perforated metal mesh that fits snugly inside a glass beaker. In use a consumer removes the plunger from the glass beaker and fills the glass beaker with hot water that was heated, typically externally in a water kettle. The consumer then adds an appropriate quantity of coffee grounds to the water and stirs the mixture to assure proper distribution of the fusible material throughout the liquid.

Next, the consumer places the plunger assembly on top. Throughout the following brewing interval (e.g., 4-7 minutes), the water temperature remains fairly constant. During this brewing interval and thereafter the glass and stainless steel of the apparatus minimize any leaching of materials into the beverage that would introduce any unwanted flavor or impurity. After the user determines that an appropriate brewing interval ends, the consumer pushes the plunger down to the bottom of the beaker. This displaces most of the grounds toward the bottom of the beaker. Then the disk on the plunger isolates the grounds from the brewed beverage to terminate any significant brewing thereafter.

Many consumers of coffee believe that the best brewed coffee is obtained by a pour-over method. There are a number of pour-over coffee drippers on the market. However, many of the available pour-over coffee or beverages drippers suffer from an number of shortcomings. For example, currently available pour-over coffee or beverages drippers tend to require large qualities coffee because the hot water that is poured over the coffee quickly passes through the filter cup and/or filter. Also, the temperature of the hot water used to steep beverages in currently available pour-over coffee or beverages drippers changes dramatically from the time that the pour-over operations begins to the time the beverage ready for consumption. Controlling steeping times and steeping temperatures are two of the most important factors for making a consistent high quality pour-over beverages.

SUMMARY OF THE INVENTION

The present invention is directed to a system for preparing beverages via a pour-over method. The system includes a capturing vessel or capturing reservoir. The capturing vessel or capturing reservoir is a preferably a vacuum sealed double walled thermos structure that keeps steeped pour-over beverages prepared by the system at a relatively constant temperature for a period of time. The capturing vessel or capturing reservoir can be equipped with a lid or cap to further constrained a beverage therein for transportation and further maintain the temperature of the beverage made during a pour-over operation. The capturing vessel or capturing reservoir is formed from steel, glass, or any other suitable material or combinations of materials.

The system further includes a filtering unit. The filtering unit includes a cup feature or pour-over reservoir that is configured for holding a filter and coupling to a flow control mechanism or flow control insert. The cup feature or pour-over reservoir is preferably a vacuum sealed double walled thermos structure. Because the cup feature or pour-over reservoir is insulated, the temperature of steeped liquid generated by a pour-over operation is maintained. The cup feature or pour-over reservoir is formed from steel, glass, or any other suitable material or combination of materials. The filtering unit can also include a cap feature that couples to the cup feature or pour-over reservoir and covers the flow control mechanism or flow control insert during storage. The cap feature can also be used to measure device to meter suitable amounts of coffee or tea to be steeped and/or as a drinking cup to consume portions of the steeped pour-over beverages made with the system of the present invention.

In accordance with the embodiments of the invention, the flow control mechanism or flow control insert is permanently attached to or is monolithic with cup feature. Alternatively the flow control mechanism or flow control insert detachably couples to the cup feature or pour-over reservoir. Where the flow control mechanism or flow control insert detachably couples to the cup feature or pour-over reservoir, the cup feature or pour-over reservoir and the flow control mechanism have matched treaded or matched snap features. Alternatively, the flow control mechanism or insert is seated through an aperture positioned on a bottom portion of the cup feature or pour-over reservoir and the flow control mechanism or flow control insert is secured to the cup feature or pour-over reservoir through a gasket, a grommet and/or an O-ring made from an elastic material, such as rubber or silicone.

Regardless of weather the flow control mechanism or flow control or flow control insert is permanently coupled to the cup feature or pour-over reservoir or the flow control mechanism or flow control insert detachably couples to the cup feature of pour-over reservoir, the gasket, the grommet and/or the O-ring helps to secure, seat or stabilize the filtering unit over a receiving and dispensing aperture on top of the capturing vessel or capturing reservoir during a pour-over operation.

A bottom portion of the flow control mechanism or flow control insert is patterned with alternating bumps or protrusion structures and apertures or drain holes. The pattern of bumps or protrusion structures and apertures or drain holes on the bottom portion of the flow control mechanism or flow control insert allows liquid to have a proper residency time within the cup feature or pour-over reservoir to produce a properly steeped beverage during a pour-over operation. Wherein the flow control mechanism or insert is detachably coupled to the cup feature or pour-over reservoir the flow control mechanism or flow control insert can be disposable and pre-charged with a metered amount of an infusible material, such as coffee or tea, and can be used as a cap or lid for the capturing vessel or capturing reservoir. Where the flow control mechanism or flow control insert is permanently attached to cup feature or pour-over reservoir, the flow control mechanism or flow control insert is preferably formed from stainless steel or any other suitable material or materials that can be easily cleaned.

The pour-over beverage system of the present invention addresses a number of the shortcoming of previously available pour-over beverage systems. The flow control mechanism or flow control insert allows liquid to have a proper residency time within the cup feature or pour-over reservoir to produce a properly steeped beverage during a pour-over operation and the insulted cup feature or pour-over reservoir maintains the temperature of the steeping liquid within the filtering unit to produce consistently steeped beverages during pour-over operations.

DETAILED DESCRIPTION OF THE INVENTION

Figure 1:
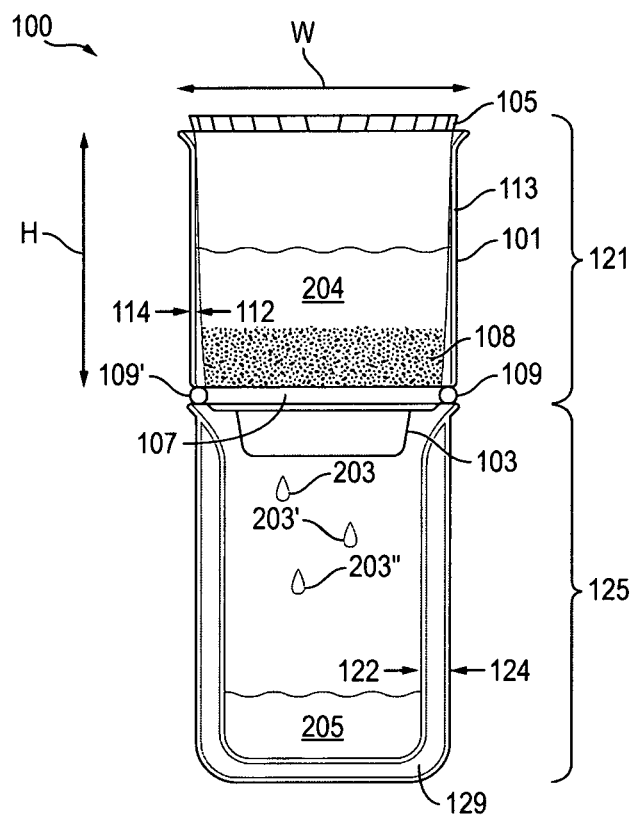
FIG. 1 shows a cross-sectional-sectional view of pour-over beverage system with a capturing vessel and filtration unit, in accordance with the embodiments of the invention.

FIG. 1 shows a cross-sectional-sectional view of pour-over beverage system 100 with a capturing vessel or capturing reservoir 125 and filtration unit 121. The filtration unit 121 preferably has a height (H) of between 2.5 and 6 inches and a width (W) of between 2.5 and 4 inches.

Still referring to FIG. 1, the filtration unit 121 includes a cup feature or pour-over reservoir 101 that is configured for holding a filter 105. The because the dimensions of the filtration unit 121 are not dimensions that are similar to that of conventional a pour-over drip beverage systems, the present invention uses customized disposable filters 105 designed to properly fit within the cup feature or pour-over reservoir 101. The cup features or pour-over reservoir 101 is preferably a vacuum sealed 113 double walled 112 and 114 thermos structure that keeps a steeping liquid 204 hot during a pour-over operation. The cup feature or pour-over reservoir 101 is preferably formed from steel, glass, or any other suitable material or combination of materials. The filtration unit 121 further includes a flow control mechanism or flow control insert 103 that is coupled to the cup feature or pour-over reservoir 101. The flow control mechanism or flow control insert 103 is preferably formed from stainless steel or any other suitable material or combination of materials that can be easily cleaned.

The capturing vessel or capturing reservoir 125 is a preferably a vacuum sealed 129 double walled 122 and 124 thermos structure that keeps a steeped and dispensed pour-over beverage 205 at a relatively constant temperature for a period of time after being prepared by the pour-over beverage system 100. The capturing vessel or capturing reservoir 125 can be equipped with a lid or cap (not shown) to help contain the dispensed and steeped pour-over beverage 205 therein during transportation and help to further maintain the temperature of the dispensed and steeped pour-over beverage 205. The capturing vessel or capturing reservoir 125 is formed from steel, glass, or any other suitable material or combination of materials.

In operation a suitable amount of an infusible material 108, such as coffee or tea is placed within the filter 105 and cup feature or pour-over reservoir 101. Then a metered amount of pour-over liquid 204, such as hot water, is poured over the infusible material 108. As the combination of the infusible material 108 and the pour-over liquid 204 steep, the steeped beverage drips 203/203' through the flow control insert 103 to produce a dispensed and steeped pour-over beverage 205 contained within the capturing vessel or capturing reservoir 125.

Figure 2A:
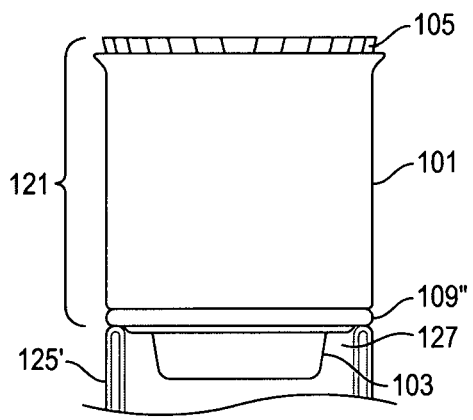
FIG. 2A shows a view of a filtration unit with a cup feature or pour-over reservoir and flow control mechanism or flow control insert secured to or seated over a receiving and dispensing aperture of a suitable capturing vessel, in accordance with the embodiments of the invention.

Referring now to FIG. 1 and FIG. 2A, the flow control mechanism or flow control insert 103 includes an gasket, grommet and/or O-ring 109 and 109' (109"; FIG. 2A) that fits over a sleeve 107. The gasket, grommet and/or O-ring 109" is made from an elastic material, such as rubber or silicone. The gasket, grommet and/or O-ring 109" helps to secure, seat or stabilize the filtering unit 121 over a receiving and dispensing aperture 127 on top of a suitable capturing vessel or capturing reservoir 125'. Preferably, the filtering unit 121 is secured to or seated over the receiving and dispensing aperture 127 capturing vessel or reservoir 125' with a portion of the flow control mechanism or flow control insert 103 positioned within the capturing vessel or capturing reservoir 125', as shown. It will be clear to one skilled in the art that the capturing vessel or capturing reservoir 125' can have any number of different sizes and shapes.

Figure 2B:
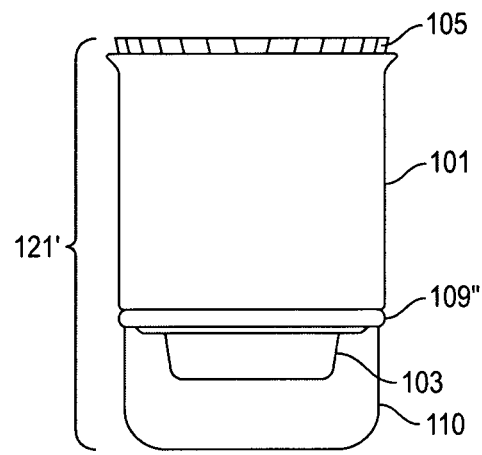
FIG. 2B shows a view of a filtration unit with a cup feature or pour-over reservoir, flow control mechanism or flow control insert connected to a removable cup feature, in accordance with the embodiments of the invention.

FIG. 2B shows a filtration unit 121' with a cup feature or pour-over reservoir 101, a flow control mechanism or flow control insert 103, a gasket, grommet and/or O-ring 109" and a filter 105, such as described above. The filtration unit 121' further includes a removable cap feature 110 that couples to the cup feature or pour-over reservoir 101. The removable cap feature 110 couples to the cup feature or pour-over reservoir 101 through the gasket, grommet and/or O-ring 109" such as shown, or alternatively through matched snap or screw features on the cup feature or pour-over reservoir 101 and the removable cap feature 110. The cap feature 110 covers and protects the flow control mechanism or flow control insert 103 during storage. The cap feature 110 can also be used to measure suitable amounts of an infusible material to be steeped during a pour-over operation and can be used as a drinking cup to consume portions of the dispensed steeped pour-over beverages made with the pour-over beverage system 100 (FIG. 1) of the present invention.

Figure 2C:
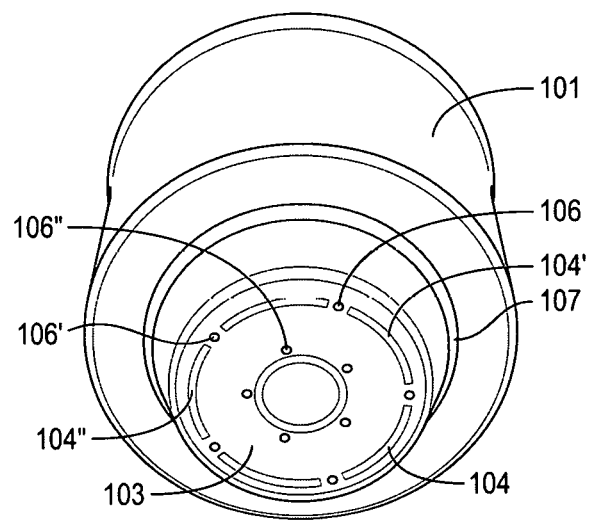
FIG. 2C shows a perspective view of a filtration unit with flow control mechanism or flow control insert patterned bumps or protrusion structures and apertures or drain holes to control flow rates of steeped pour-over beverages, in accordance with the embodiments of the invention.

FIG. 2C shows a perspective view of a filtration unit with a cup feature or pour-over reservoir 101 and flow control mechanism or flow control insert 103 having a sleeve 107 for attaching a gasket, grommet and/or O-ring 109" (FIGS. 2A-B). The flow control mechanism or flow control insert 103 is patterned bumps or protrusion structures 104, 104' and 104" and apertures or drain holes 106, 106' and 106" to control dispensing flow rates, indicated by drops 203, 203' and 203", (FIG. 1) of steeped pour-over liquid 204 (FIG. 1) from the dispensing unit 121 (FIG. 1).

Figure 3:
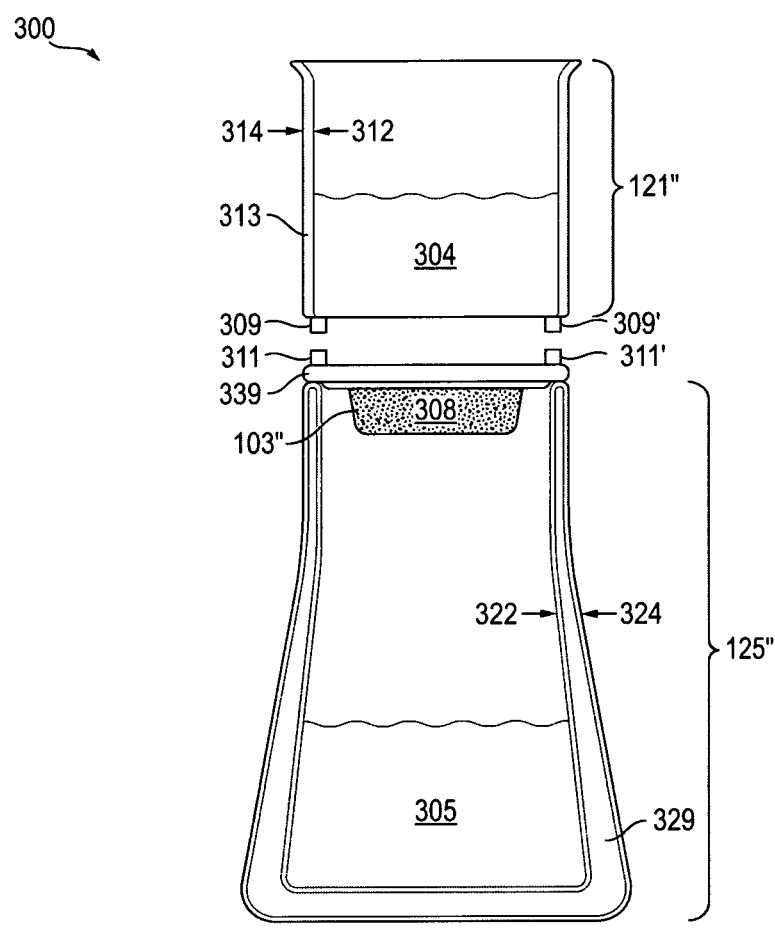
FIG. 3 shows a view of a pour-over beverage system with a capturing vessel and filtration unit with a detachable flow control mechanism or flow control insert, in accordance with an alternative embodiments of the invention.

FIG. 3 shows a view of a pour-over beverage system 300 with a capturing vessel 125" and filtration unit 121", in accordance with alternative embodiments of the invention. The pour-over beverage system 300 also includes a detachable flow control mechanism or flow control insert 103". The detachable flow control mechanism or flow control insert 103" is preferably capable of being secured to or seated over a receiving and dispensing aperture 327 and 327' of a capturing vessel or capturing reservoir 125" with a portion of the detachable flow control mechanism or flow control insert 103" positioned within the capturing vessel or reservoir 125", as shown. The detachable flow control mechanism or flow control insert 103" can also include a gasket, grommet and/or O-ring 339 to help secure or seat the detachable flow control mechanism or flow control insert 103" over the receiving and dispensing aperture 327 and 327' of capturing vessel or capturing reservoir 125".

Still referring to FIG. 3, the capturing vessel or capturing reservoir 125" is a preferably a vacuum sealed 329 double walled 322 and 324 thermos structure that keeps dispensed and steeped pour-over beverage 305 contained therein at a relatively constant temperature for a period of time after being prepared by the pour-over operation with the pour-over beverage system 300. The pour-over beverage system 300 also includes a cup feature or pour-over reservoir 121" that is preferably a vacuum sealed 313 double walled 312 and 314 thermos structure that keeps a pour over liquid 304 hot during the pour-over operation.

In operation, a suitable amount of an infusible material 308, such as coffee or tea is placed within the detachable flow control mechanism or flow control insert 103". Then that cup feature or pour-over reservoir 121" is attached to the detachable flow control mechanism or flow control insert 103" through matched threaded or snap features 309/309' and 311/311'. A metered amount of pour-over liquid 304 is then poured over the infusible material 308 and steeped beverage drips through apertures or drain holes on a bottom surface of the removable flow control insert 103" to produce a dispensed stepped pour-over beverage 305 contained within the capturing vessel or reservoir 125". After the pour-over beverage 305 is made with the pour-over beverage system 300, the cup feature or pour-over reservoir 121" is detached from the detachable flow control mechanism or flow control insert 103" and the detachable flow control mechanism or flow control insert 103" can be used as a cap or lid for the capturing vessel or reservoir 125".

Preferably, the removable flow control unit or insert 103" is formed from stainless steel or any other suitable material that can be easily cleaned or, alternatively, is formed from metal foil or plastic and is disposable. In accordance with this embodiment of the of the invention the detachable flow control mechanism or flow control insert 103" is pre-charged with a suitable and metered amount of infusible material 308.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A pour-over beverage system comprising:
   a) a double walled vacuum sealed cup feature or pour-over reservoir;
   b) a flow control mechanism or flow control insert attached to a bottom portion of the double walled vacuum sealed cup feature or pour-over reservoir, wherein a bottom surface of the flow control mechanism or flow control insert is patterned to control dispensing rates of steeped beverages from the double walled vacuum sealed cup feature or pour-over reservoir into a capturing vessel or capturing reservoir;
   c) a gasket, grommet or O-ring surrounding the flow control mechanism or flow control insert to secure or seat the flow control mechanism or flow control insert over a receiving and dispensing aperture of the capturing vessel or capturing reservoir; and
   d) a removable cap feature that couples to the cup feature or pour-over reservoir through the gasket, grommet or O-ring such as to cover and protects the flow control mechanism or flow control insert during storage.

2. The pour-over beverage system of claim 1, wherein the double walled vacuum sealed cup feature or pour-over reservoir has a height (H) of between 2.5 and 6 inches and a width (W) of between 2.5 and 4 inches.

3. The pour-over beverage system of claim 1, wherein the double walled vacuum sealed cup feature or pour-over reservoir is formed from stainless steel.

4. The pour-over beverage system of claim 1, the bottom surface of the flow control mechanism or flow control insert is patterned with alternating bumps or protrusion structures and apertures or drain holes.

5. A pour-over beverage system comprising:
   a) a double walled vacuum sealed cup feature or pour-over reservoir;
   b) a flow control mechanism or flow control insert attached to a bottom portion of the double walled vacuum sealed cup feature or the pour-over reservoir;
   c) a double walled vacuum sealed capturing vessel or capturing reservoir, wherein a bottom surface of the flow control mechanism or flow control insert is patterned to control dispensing rates of steeped beverages from the double walled vacuum sealed cup feature or the pour-over reservoir into the double walled vacuum sealed capturing vessel or the capturing reservoir;
   d) a gasket, grommet or O-ring surrounding the flow control mechanism or flow control insert to secure or seat the flow control mechanism or flow control insert over a receiving and dispensing aperture of the double walled vacuum sealed capturing vessel or the capturing reservoir; and e) a removable cap feature that couples to the double walled vacuum sealed cup feature or the pour-over reservoir through the gasket, grommet or O-ring such as to cover and protects the flow control mechanism or flow control insert during storage.

6. The pour-over beverage system of claim 5, wherein the double walled vacuum sealed cup feature or the pour-over reservoir has a height (H) of between 2.5 and 6 inches and a width (W) of between 2.5 and 4 inches.

7. The pour-over beverage system of claim 5, wherein the double walled vacuum sealed cup feature or the pour-over reservoir is formed from stainless steel and the double walled vacuum sealed capturing vessel or capturing reservoir is formed from glass.

8. The pour-over beverage system of claim 5, the flow control mechanism or flow control insert is formed form stainless steel and the bottom surface of the flow control mechanism or the flow control insert is patterned with alternating bumps or protrusion structures and apertures or drain holes.

9. A pour-over beverage system comprising:

a) a double walled vacuum sealed cup feature or pour-over reservoir; and b) a flow control mechanism or flow control insert that detachably couples to a bottom portion of the double walled vacuum sealed cup feature or pour-over reservoir, wherein steeped beverages are dispensed from the double walled vacuum sealed cup feature or pour-over reservoir through the flow control mechanism or flow control insert into a capturing vessel or a capturing reservoir;

c) a gasket, grommet or O-ring surrounding the flow control mechanism or flow control insert to secure or seat the flow control mechanism or flow control insert over a receiving and dispensing aperture of the capturing vessel or the capturing reservoir; and d) a removable cap feature that couples to the double walled vacuum sealed cup feature or the pour-over reservoir through the gasket, grommet or O-ring such as to cover and protects the flow control mechanism or flow control insert during storage.

10. The pour-over beverage system of claim 9, wherein the flow control mechanism or the flow control insert that detachably couples to a bottom portion of the double walled vacuum sealed cup feature or pour-over reservoir through matched threaded features or match snap features.

11. The pour-over beverage system of claim 9, wherein the flow control mechanism or the flow control insert is pre-charged with a metered amount of an infusible material.

12. The pour-over beverage system of claim 11, wherein the infusible material is coffee.

13. The pour-over beverage system of claim 9, wherein the double walled vacuum sealed cup feature or the pour-over reservoir is formed from stainless steel.

* * * * *